Figure 1:
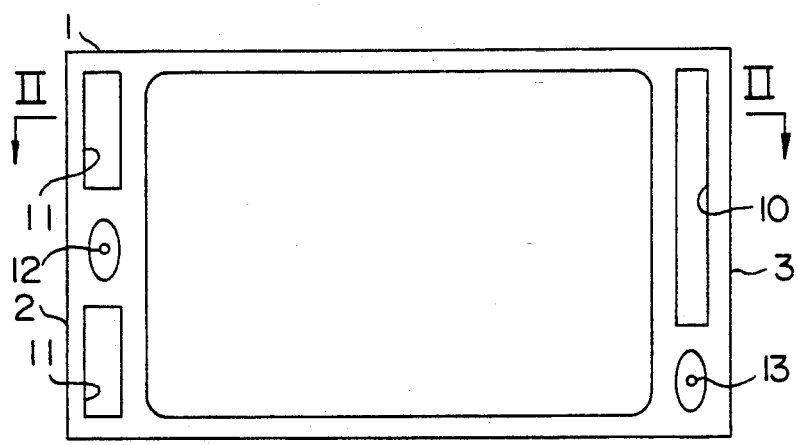

United States Patent [19]
Chatelain

[11] Patent Number: 5,119,429
[45] Date of Patent: Jun. 2, 1992

[54] AUDIO INSTALLATION, IN PARTICULAR STEREOPHONIC, FOR TELEVISION SETS WITH A LARGE BUILT-IN LOW-FREQUENCY LOUDSPEAKER

[75] Inventor: Jean-Yves Chatelain, St Barthelemy d'Anjou, France

[73] Assignee: Societe Electronique de la Region Pays de Loire, Courbevoie, France

[21] Appl. No.: 465,091

[22] PCT Filed: Nov. 16, 1989

[86] PCT No.: PCT/FR89/00223

§ 371 Date: Dec. 20, 1989

§ 102(e) Date: Dec. 20, 1989

[87] PCT Pub. No.: WO89/11198

PCT Pub. Date: Nov. 16, 1989

[30] Foreign Application Priority Data

May 6, 1988 [FR] France .................. 88 06116

[51] Int. Cl.⁵ .............................. H04R 1/02
[52] U.S. Cl. ..................... 381/90; 381/188; 381/205

[58] Field of Search ........... 381/24, 188, 205, 90; 358/254; 181/144, 145, 146, 147, 148, 150, 151, 152, 156

[56] References Cited

U.S. PATENT DOCUMENTS 3,086,078  4/1963  Sharma .
3,523,589  8/1970  Vivra .
4,128,738  12/1978  Gallery .

FOREIGN PATENT DOCUMENTS 0117487  9/1984  European Pat. Off. .
0125625  11/1984  European Pat. Off. .
0154219  9/1985  European Pat. Off. .
1007058  4/1952  France .

Primary Examiner—Forester W. Isen
Attorney, Agent, or Firm—Roland Plottel

[57] ABSTRACT

The stereophonic system of the invention comprises two tweeters (12, 13) fixed to the front panel, and a low-frequency loudspeaker (4) fixed to an enclosure (6) inside the back of the cabinet. It is thus possible to use a large low-frequency loudspeaker.

10 Claims, 1 Drawing Sheet

AUDIO INSTALLATION, IN PARTICULAR STEREOPHONIC, FOR TELEVISION SETS WITH A LARGE BUILT-IN LOW-FREQUENCY LOUDSPEAKER

The present invention relates to an audio installation, in particular stereophonic, for television sets with a large built-in low-frequency loudspeaker.

Present day aesthetic considerations with regard to television sets, in particular television sets with large and almost flat screens, demand cabinets which have, on each side of the cathode ray tube "audio columns" which are very narrow. Now it is known that in order to correctly reproduce the low frequencies of the audio spectrum, it is necessary to use large loudspeakers, preferably circular or elliptical loudspeakers. Such loudspeakers cannot be housed in these narrow audio columns. This problem is currently solved either by using low-frequency loudspeakers which are too small or which have a very elongated shape, or by connecting external loudspeakers housed in baffles which are independent of the television set. For stereophonic reproduction it is therefore necessary to use two such baffles An object of the present invention is an audio installation, in particular a stereophonic audio installation for a television set, using a large loudspeaker for the reproduction of low frequencies, which loudspeaker is disposed in the cabinet of the television set.

The audio installation according to the invention comprises, in addition to the loudspeakers for reproducing the high frequencies of the audio spectrum, which are normally fixed to the front panel of the television set, at least one loudspeaker for the reproduction of low frequencies which is disposed in the cabinet of the television set, in its rear section, and associated with an enclosure opening on one side of the front panel of the television set. Preferably this enclosure is filled with a sound-absorbing product such as glass wool Advantageously, the rear cover and the internal surfaces of the cabinet which are not occupied by the enclosure are lined with sound-absorbing product.

Figure 2:
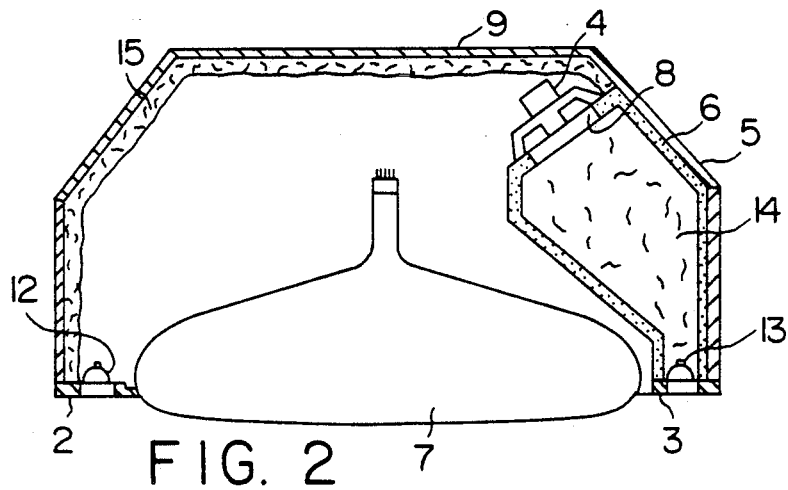
Figure 3:
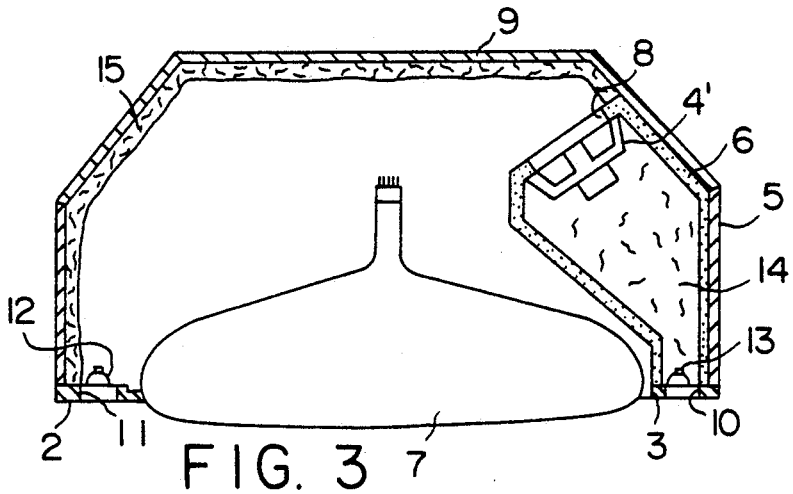

The present invention will be better understood on reading the following detailed description of two embodiments, taken as non-limitative examples and illustrated by the appended drawing in which:

FIG. 1 is a front view of a television set according to the invention without the decorative front panel grids, FIG. 2 is a plan view in cross-section along II—II in FIG. 1, and FIG. 3 is view similar to that of FIG. 2 of another embodiment of a television set according to the invention.

The television set shown in the drawing is of the type having a cabinet having, on the front panel 1, two "audio columns" 2, 3, extending over the entire height of the front panel and over a narrow width of about 10 cm. In present day television sets of known type, the front panel includes, for each audio column, a cut-out for a loudspeaker for reproducing high frequencies (known as a "tweeter") and a loudspeaker for the reproduction of the low frequencies and the medium frequencies of the audio spectrum. Because of the very narrow width of the columns, the low- and medium-frequencies loudspeaker can only be of mediocre quality.

The audio installation according to the invention comprises a loudspeaker 4 of large size (for example having a diameter of at least 10 cm) capable of correctly reproducing, in particular, the low frequencies of the audio spectrum (starting from about 30 Hz). This loudspeaker 1 is fixed in the rear section of the cabinet 5 of the television set.

According to the embodiment shown in FIG. 2, the loudspeaker 4 is fixed to the rear of the acoustic enclosure 6, about half way up the vertical height of the television set This enclosure 6 is produced from a material currently used for producing acoustic enclosures, such as a compound of wood particles or of loaded plastic, of appropriate thickness (a thickness of at least about 10 mm) The enclosure 6 extends over almost the entire height of the television set cabinet Its shape is adapted to the space remaining between the cathode ray tube 7 and one of the sides of the cabinet 5. In the drawing, the enclosure is disposed in the right hand section of the cabinet, but it is of course understood that it could just as well be in the left hand section.

In the front section of the cabinet 5, the enclosure 6 has a narrow width determined by the width of the audio columns 2 or 3 and, on the other hand, at the rear the enclosure 6 extends over almost half of the width of the rear section of the cabinet. Between the front and the rear, the profile of the enclosure 6 is determined by the shape of the cabinet 5 and of the cathode ray tube 7. It is preferable that on its side closest to the cabinet the profile of the enclosure closely follows that of the cabinet, while on the side closest to the cathode ray tube, it is distant from the latter by several centimeters in order not to touch it, taking account of manufacturing tolerances and the positioning of the tube.

The rear surface 8 of the enclosure can be parallel to the rear cover 9 and be situated at a distance away from it sufficient to house the loudspeaker 4 and to allow the sound waves to pass, the loudspeaker being fixed on this surface 8. According to the embodiment shown in the drawing, the surface 8 of the enclosure makes an angle of 20° to 30° approximately with respect to the rear cover 9.

According to the embodiment shown in FIG. 2, the loudspeaker 4 is fixed on the surface 8, on the outside of the enclosure, in front of a corresponding cut-out in this surface 8. The forward wave of the loudspeaker 4 therefore passes into the enclosure 6 and emerges from it through the opening 10 provided in the front panel 1 on the side of the column 3. The backward wave of the loudspeaker 4 travels towards the opening 11 provided in the front panel 1, on the side of the column 2, travelling around the tube 7.

The left and right tweeters 12 and 13, because they are of small size, are fixed directly to the rear surface of the front panel 1, in the columns 2 and 3. Both of them can be fixed at the bottom of these columns as shown in the right hand section of FIG. 1 (or at the top according to an embodiment which is not shown), or in the centre of these columns as shown in the left hand section of FIG. 1. In the first case, the openings 10, 11 for the passage of the forward and backward waves of the loudspeaker 4 are single rectangular openings for each column, extending over the entire height available above the corresponding tweeters In the second case, the openings 10, 11 are rectangular but in two sections extending above and below the corresponding tweeters.

The embodiment shown in FIG. 3 is similar to that of FIG. 2, the only difference being that the low-frequency loudspeaker 4' is fixed to the partition 8 of the enclosure 6 on the inside of this enclosure.

In order to improve the acoustic qualities of the device of the invention, the enclosure 6 is filled with acoustically absorbent material 14, such as glass wool. Advantageously, such an absorbent material 15 is fixed to the rear cover 9 and to the internal surfaces of the cabinet 5.

The device of the invention enables a stereophonic effect to be obtained with a single low-frequency loudspeaker and two tweeters, since the low frequencies of the sound spectrum are not very directive (it is difficult to locate their source exactly) and provide practically no contribution to the stereophonic effect which is essentially due to the tweeters Advantageously, if true stereophonic sources are available, it is possible to use a double coil loudspeaker for the loudspeaker 4.

The invention has been described above with reference to an installation with a single low-frequency loudspeaker, but is of course understood that a second loudspeaker could be used, fixed to an enclosure similar to the enclosure 6, symmetrically with respect to the axis of the tube 7.

I claim:

1. Audio installation, in particular a stereophonic installation for a television set with a large built-in low-frequency loudspeaker, also including tweeters fixed to the front panel of the television set, comprising at least one loudspeaker for the reproduction of low frequencies (4), being disposed in the cabinet of the television set, in its rear section, and having an enclosure (6) opening on one side (10) of the front panel of the television set.

2. Audio installation, in particular a stereophonic installation for a television set with a large built-in low-frequency loudspeaker, also including tweeters fixed to the front panel of the television set, comprising at least one loudspeaker for the reproduction of low frequencies (4), which is disposed in the cabinet of the television set, in its rear section, and associated therewith an enclosure (6) opening on one side (10) of the front panel of the television set and wherein the enclosure is filled with sound absorbing material (14).

3. Audio installation according to either of the previous claims, characterized in that the rear cover (9) and the internal surfaces of the cabinet which are not occupied by the enclosure are lined with sound-absorbing material.

4. An audio installation according to claim 1, wherein said enclosure extends over almost the entire height of the cabinet.

5. An audio installation according to claim 1 or 4, wherein the low frequency speaker is fixed to the enclosure about half way up the vertical height of the cabinet.

6. An audio installation according to claim 1, wherein said opening (10) extends over substantially a majority of the height of said cabinet.

7. An audio installation according to claim 1, wherein said low frequency loud speaker is fixed on an outside wall of said enclosure.

8. An audio installation according to claim 1, wherein said low frequency loud speaker is fixed on an inside wall of said enclosure.

9. An audio installation according to claim 1, wherein said low frequency loud speaker comprises a double coil.

10. Audio installation, in particular a stereophonic installation for a television set with a large built-in low-frequency loudspeaker, comprising tweeters fixed to a front panel of the television set, comprising at least one loudspeaker for the reproduction of low frequencies (4), being disposed in the cabinet of the television set, in its rear section, and having an enclosure (6) extending from the low-frequency loudspeaker to an opening on one side (10) of the front panel of the television set, said enclosure having sound absorbing material (14), and said low frequency loudspeaker being fixed to said enclosure about half way up the vertical height of the cabinet, and the enclosure opening extending over substantially a majority of the height of said cabinet.

* * * * *